_United States Patent_ [19]

Davis, deceased et al.

[11] Patent Number: 4,499,682
[45] Date of Patent: Feb. 19, 1985

[54] FISHING LURE

[76] Inventors: Lester M. Davis, deceased, late of Gig Harbor, Wash.; Ruth L. Davis, executrix, 10805-36th St. NW., Gig Harbor, Wash. 98335

[21] Appl. No.: 420,036

[22] Filed: Sep. 20, 1982

[51] Int. Cl.³ .............................................. A01K 85/00
[52] U.S. Cl. .................................. 43/42.19; 43/42.36; 43/42.52
[58] Field of Search ................... 43/42.19, 42.5, 42.52, 43/42.36, 42.2, 42.21, 42.51

[56] References Cited

U.S. PATENT DOCUMENTS

| | | | |
|---|---|---|---|
| 1,820,759 | 8/1931 | Oster | 43/42.52 |
| 1,991,142 | 2/1935 | Eggleston | 43/42.51 |
| 2,522,179 | 9/1950 | Jensen, Sr. et al. | 43/42.36 |
| 2,820,316 | 1/1958 | Willie | 43/42.36 |
| 2,986,812 | 6/1961 | Arter, Jr. et al. | 43/42.5 |
| 3,834,058 | 9/1974 | Gaunt | 43/42.51 X |

FOREIGN PATENT DOCUMENTS 8182  9/1913  Sweden .............................. 43/42.19

_Primary Examiner_—Gene P. Crosby
_Assistant Examiner_—P. Weston Musselman, Jr.

[57] ABSTRACT

This fishing lure is heavier than water or has a greater specific gravity than water and thus, the same will sink in water to be fished. The lure has an elongated body having two spaced apart, parallel, side surface portions and two end surface portions connected with said side surface portions. Each side surface face connects with one end surface portion at an acute angle and with the other end surface at an obtuse angle. The opposite side surface face connects with the one end surface portion at an obtuse angle and with the other end portion at an acute angle. The lure body tapers toward both ends and thus the mid portion is sufficiently relatively heavy so that in sinking, the lure remains substantially level and does not sink with either end portion pointing downwardly. As the lure body tends to remain level as the same sinks, the acute angle between an end surface portion and a side surface member facilitates turning or angular movement of the fishing lure about its longitudinal axis as the same sinks. The wobbling and turning motions of the lure as it sinks simulates the motion of a wounded minnow and also makes sonic noises which can be heard by and which will attract fish.

7 Claims, 5 Drawing Figures

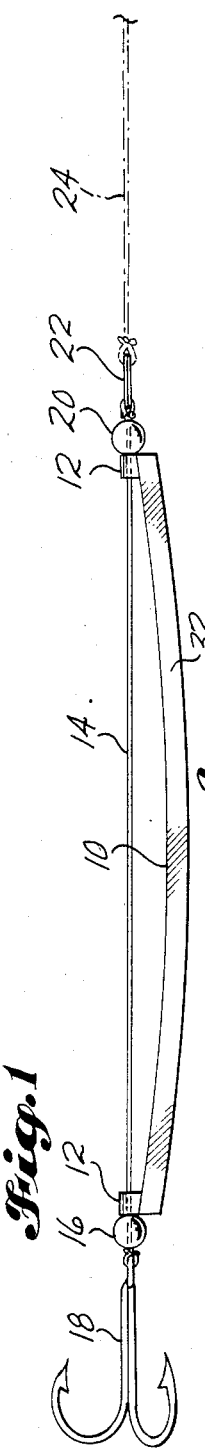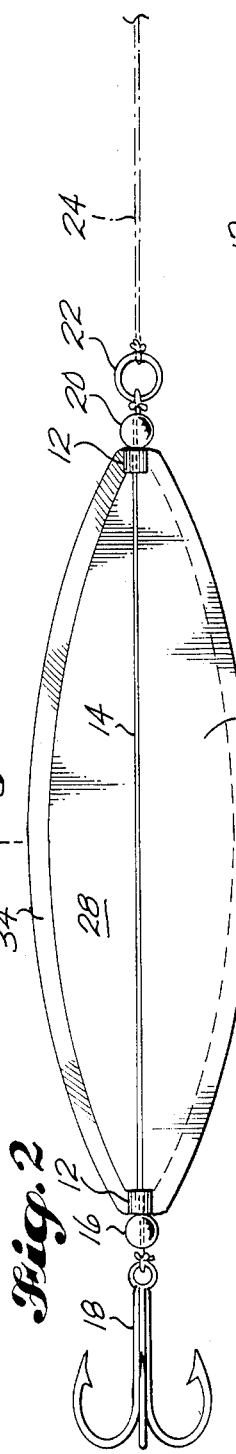

FISHING LURE

BACKGROUND OF THE INVENTION

Often larger fish will travel through a school of food fish and during such travel, they will vigorously move their tails and by contact with the food fish, they will stun a number by this tail action. Then the larger fish will return through the school of minnows and swallow the maimed or crippled food fish. Thus, one type of fishing lure is that which somewhat resembles the action of crippled bait fish. My lure is one that is best employed if secured to a slack line that is allowed to periodically settle of its own weight and this is followed by periodic six or seven soft strokes, all as in conventional spinning. This allows the lure to sink periodically because of its specific gravity. Also, as the lure tapers toward both ends and is heavy in the mid portion, it tends to remain level as it sinks and neither end portion tends to go down first. As the lure sinks, the angular relation of the side surfaces to the face surfaces causes the lure to turn about its longitudinal axis. The lure is rotatably mounted as respects the fishing line so the fishing line does not interfere with the turning motion of the lure. Also, the turning action of the lure in water causes certain sonic noises which can be heard by and often attract fish toward the lure.

Prior art known to the inventor include the following U.S. Pat. Nos. 1,871,387; 2,117,206; 2,624,147; 3,127,694; 3,175,324; 3,367,057; 3,540,144; 3,656,253; 3,680,247; 3,782,024; 3,905,147; 4,073,084; and 3,611,615.

It is an object of my invention to provide a lure which will have features so that if the tension on the fishing line is released, such as during spinning, the lure will sink and maintain a horizontal stance during sinking. Also, the lure, by reason of the angular relation between its faces and sides, will tend to turn about its longitudinal axis as it sinks. The lure will be mounted for relative rotary movement as respects the fishing line so that the fishing line will not interfere with the tumbling and turning motions of the lure as the lure sinks by what may well be termed a free fall. This turning and twisting action of the lure as it free falls will generate some vibrations which can be heard by fish and thus, the lure operates to attract fish, both by sight and sound.

Other objects, advantages, and utilities of my invention will become implicit and explicit as the description proceeds in connection with the following detailed description of my invention.

BRIEF DESCRIPTION OF THE DRAWINGS

FIG. 1 is a somewhat diagrammatic view of a device embodying my invention mounted on a fishing leader;

FIG. 2 is a view similar to FIG. 1 taken substantially at right angles to FIG. 1;

FIG. 3 is a view taken substantially on broken line 3—3 of FIG. 2;

FIG. 4 is a view similar to FIG. 2 of a modified form of my invention; and

FIG. 5 is a view similar to FIG. 2 of a still further modified form of my invention.

DESCRIPTION OF PREFERRED EMBODIMENTS OF MY INVENTION

Throughout the description, like reference numerals will refer to like parts. The body of lure 10 is preferably arcuate longitudinally. The lure 10 carries line bearing means 12, preferably one disposed at each end portion thereof. These bearing means 12 have openings therein through which the line portion 14 is threaded. Preferably, the line portion 14 is the leader or nylon portion of the fishing line to provide for desirable long life, ready rotation in bearing means 12, and desired invisibility characteristics to the fish. One end portion of the line portion 14 is provided with the usual bead means 16 and the fishhook 18 and the other end portion is provided with the usual bead means 20, eye 22, and line portion 24 (the latter leading to the fisherman).

The body 10 has a density greater than that of the water fished in and will, therefore, a sink. It may be made of metal with a suitable coating and decorated surface thereon or be made of a plastic having the desired density. The body 10 is relatively wide at its mid portion compared to its end portions as best appears in FIG. 2 and tapers from such mid portion to a narrower width at each end portion. Thus, when spinning and when the line portion 24 leading to the fisherman is allowed to go slack, the body portion, because of its specific gravity, will sink and the same does not tend to dive with either end portion leading but tends to maintain its level position as shown in FIG. 1 during the sinking. As the lure descends, the arcuate angle 25 between end face surface 32 and side face surface 28 (shown by the extending dotted lines) tends to cause the lure body 10 to turn about is longitudinal axis or about the line portion 14. As there is a corresponding acute angle between side face surface 30 and end face surface 34, both acute angles will have the same action as respects turning action of the lure about its longitudinal axis. In section, the end faces 32 and 34 are parallel and the side face surfaces 28 and 30 are parallel or equal distances apart. The obtuse angles between side face surface 28 and face 34 and between side face surface 30 and end face 32 do not interfere with but, on the contrary, assist in providing the turning motion of the lure body 10 about its longitudinal axis or about the line portion 14.

In the embodiment of FIG. 4, two mating concavo-convex side face surfaces 36 and 38 are shown. The side face surfaces 36 and 38 are again parallel or spaced apart at equal distances. Such surfaces 36 and 38 intersect the end surfaces 40, 42 to form the acute and obtuse angles and thus cause or assist in the turning action of the lure body about its longitudinal axis.

In the embodiment shown in FIG. 5, a hook 48 is carried directly by one end portion of the lure body 50. The lure body 50 may otherwise be the same as the lure body 10 of FIGS. 1 to 3 or that shown in FIG. 4. The other end portion of the lure body 50 is connected by swivels 52 to a line portion 54. In this way the lure body 50 is mounted for angular or turning movement relative to a line portion, as 54. Also, the lure body 50 has the same construction to induce turning or angular motion of the lure body as it descends during a rest period during spinning.

When the lure of my invention is trolled (such as between spinning usage), it has a lively and attractive and somewhat frantic or wobbling action that is attractive to fish. My lure may also be used in trolling alone or in combination with spinning. In spinning, the lure is cast and there are intermittent slack and taut conditions of the fishing line. When the line is taut, the lure is being retrieved and the lure action is similar to that while trolling and when the line is slack, the lure is spinning.

SUMMARY

It will now be apparent that I have provided a fishing lure comprising a heavier-than-water body portion 10 or 50 and each has a length which is a plurality of times greater than its width. Next, I have provided two parallel or equally spaced apart side face portions, such as 28 and 30 or 36 and 38. Next, there is provided two spaced apart end surface portions as end surface portions 32 and 34 which are parallel to each other. The end surface portions 32 and 34, each forms an acute angle with one of the side face surface portions 28 or 30 and an obtuse angle with the other thereof. It is the acute angle that induces the turning motion of the lure body about its longitudinal axis and the turning action induced by such acute angle is augmented by the arcuate curvature of the faces 36 and 38 of FIG. 4. The bearing means 12 of FIGS. 1 and 3, or FIG. 4, as well as the bearing means 52 of FIG. 5, tend to mount the fishing lure for rotary or angular movement relative to a fishing line, such as the fishing line portion 14 of FIGS. 1 to 4, or fishing line portion 54 of FIG. 5.

The two side face surface portions 28 and 30 are parallel to each other or equidistant apart and the two side face surfaces 36 and 38 of FIG. 4 are parallel or equidistant apart and are concavo-convex surfaces.

The spaced apart bearing means 12 of FIGS. 1 to 4 or the bearing means 52 of FIG. 5 provide bearing surfaces carried by the end portions of the lure 10 of FIGS. 1 to 4 or the lure 50 of FIG. 5.

In FIG. 4, the cross section of the lure having concavo-convex surfaces is best shown.

In all figures, the body portion is relatively wide in the middle and tapers inwardly therefrom to form the narrow width end portions. Also, the end portions of the body 10 are shown as being arcuate. In FIG. 5, the fishhook is attached directly to one end portion of the lure body rather than being connected to the line. In all instances, the fishing body, either 10 of FIGS. 1 to 4, or 50 of FIG. 5 are shown with parallel, or equidistant spaced side surfaces. Also, in FIG. 5, there is shown to have one surface concave and the other convex or, in other words, the lure is crosswise arched.

Obviously, changes may be made in the forms, dimensions, and arrangements of the parts of my invention without departing from the principle thereof, the foregoing setting forth only preferred forms of embodiment of my invention.

I claim:

1. A fishing lure tending to turn on its longitudinal axis when not under tension from its connecting fishing line comprising a heavier-than-water body portion having a length a plurality of times greater than its width and having two parallel, spaced apart, side face portions and two spaced apart end surface portions, said side face portions being a plurality of times greater than the end surface portions, each side face portion forming spaced apart acute and obtuse angles with the spaced apart end surface portions, the obtuse angles being disposed alternately during turning of the lure about its longitudinal axis; and bearing means carried by the body portion for rotatively mounting the body relatively to a fishing line.

2. The combination of claim 1, wherein the bearing means comprise two spaced apart bearing members carried by opposite end portions of the body portion.

3. The combination of claim 1, wherein a cross section of each of said side face portions defines concavo-convex related lines.

4. The combination of claim 1, wherein the body portion is relatively wide at its mid portion and tapers inwardly therefrom to narrow width end portions.

5. The combination of claim 4, wherein each end portion terminates in a plane disposed at right angles to axis of the lure.

6. The combination of claim 1, wherein a fishhook is secured to an end portion of the body portion.

7. The combination of claim 1, wherein the weight of the lure at its lengthwise mid portion is greater than at its end portions causing the lure to remain horizontal as it free falls in water.

* * * * *